June 2, 1970
J. B. STEVENS
3,515,394
VIBRATION DAMPING MEANS FOR RESILIENT CONVOLUTED MEMBERS
Filed June 5, 1964
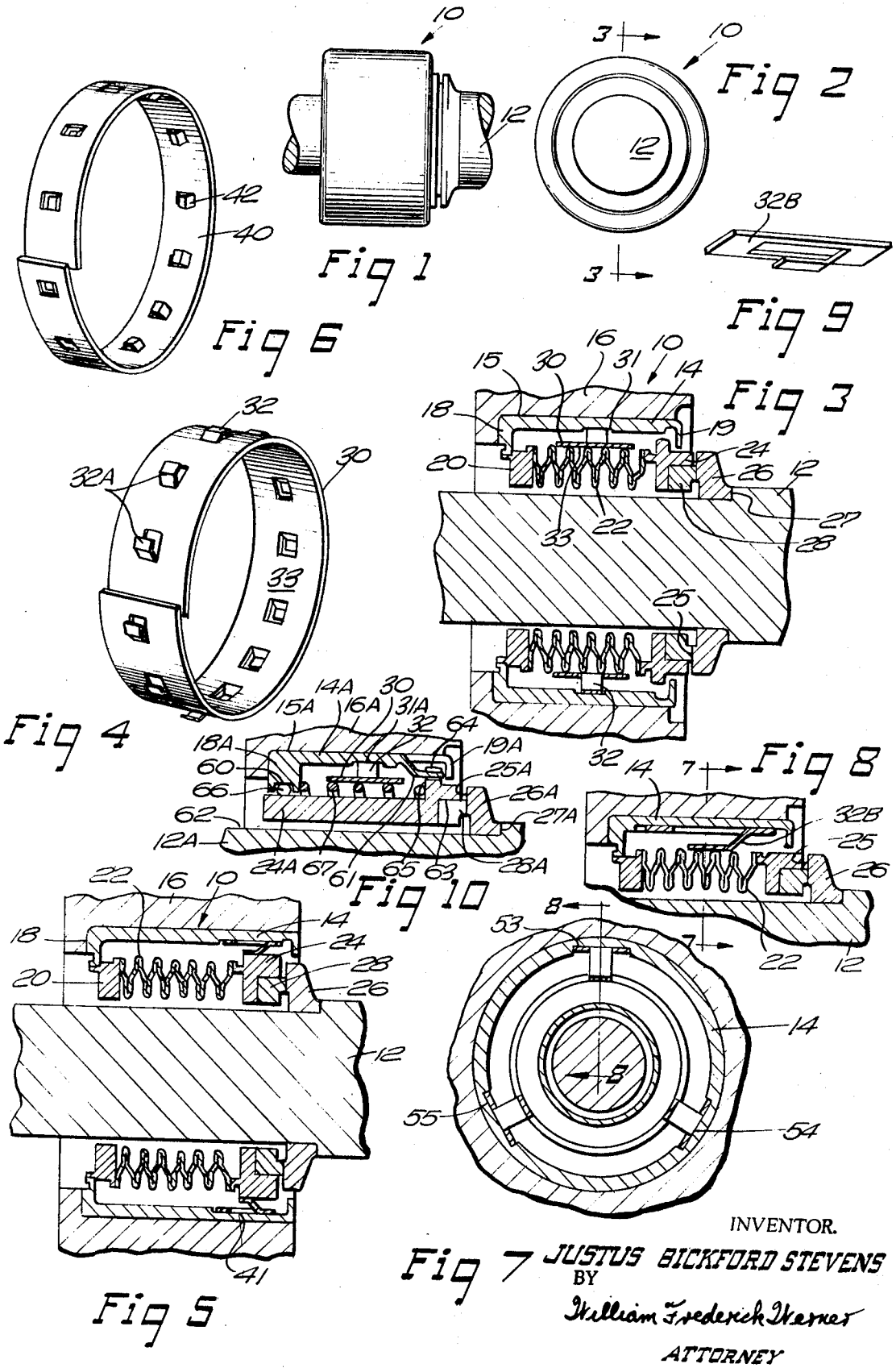
INVENTOR.
JUSTUS BICKFORD STEVENS
BY
William Frederick Werner
ATTORNEY

United States Patent Office 3,515,394
Patented June 2, 1970

3,515,394
VIBRATION DAMPING MEANS FOR RESILIENT CONVOLUTED MEMBERS
Justus Bickford Stevens, East Providence, R.I., assignor to Sealol, Inc., Warwick, R.I., a corporation of Delaware
Filed June 5, 1964, Ser. No. 373,028
Int. Cl. F16j 15/30, 15/54
U.S. Cl. 277—88                     4 Claims The present invention relates to a vibration damping means for resilient convoluted members, such as coil springs, bellows and the like, used as for example in a fluid seal, and relates more particularly to means for reducing the amplitude of the vibrations created in the resilient convoluted members through the operation of the mechanism in which the fluid seal forms a part.

In a bellows structure of the type contemplated in connection with the present invention the bellows is constituted as an assembly of bellows plates which are welded or otherwise connected together along their respective margins, one to the other to provide a tubular series of convolutions. The bellows is therefore axially contractile and extendable so that, in its installation in a pump having a rotatable shaft, for instance, it biases one operative fluid sealing member into sealing relationship with a mating member to prevent the passage of fluid past the sealing interfaces. A bellows construction and a coil spring are interchangeable.

Bellows structures of the general type just related have been found, in practice, to be quite efficient for their intended purposes. Indeed, it has been found that such bellows structures are quite acceptable in many applications beyond their applications in connection with the biasing of fluid seals. By way of illustration and without intending to limit the scope of the present invention in any manner it can be pointed out that bellows of the type contemplated herein find use in carburetors and like devices for controlling the supply of air thereto and for other similar purposes. Thus, while the present invention may be conveniently discussed in relationship to a fluid pump it will find equal application generally wherever bellows units are employed.

In the past it has been found that when a device embodying a bellows or a coil spring is installed in an environment where it is subject to vibrations the resilient convoluted members constituting the bellows or coil spring pick up the vibrations. A common example might be seen to be the gears of a pump with which a bellows or coil spring seal is used. A further instance to suggest the over-all problem would occur where vibrations are created by the face of a stationary fluid seal being out of perfect axial alignment with a companion rotating seal member. However, whatever the source of the vibrations might be, it has been found that the life of the bellows or coil spring is significantly shortened. In part, at least, this is due to metal fatigue occurring in the bellows or coil spring. As long as the mechanical vibrations do not reach the resonance frequency of the bellows or coil spring, operation of the bellows or coil spring will normally continue to be satisfactory. As soon, however, as the frequency of the mechanical vibrations reaches the resonant frequence of the bellows (or spring) the excessive flexures due to vibration cause a failure in the convolutions. For example, the convolutions of a bellows (or spring) tend to "walk" or gang up at one end of the bellows structure with excessive deflection imposed upon certain individual convoluted members to thereby create excessive flexures.

A variety of techniques have been proposed for damping the vibrations of the bellows, but none have been entirely satisfactory. It is known, for instance, to utilize fluid damping means. However, such fluid structures are complex, relatively expensive, and difficult to maintain. A variety of damping means utilizing various kinds of sheet material such as rubber, tetrafluoroethylene, and similar substances have been suggested. Commonly, such sheet material is inserted between the various layers of plates comprising the bellows. Such sheet material not only may limit the use of the bellows due to deterioration in chemical environments and the like, but also present serious problems in manufacturing the bellows and maintaining the operation of the bellows under varying temperature conditions.

It is, therefore, one object of the present invention to provide a bellows structure having means for damping vibrations of the bellows.

A further object of the present invention is to provide a device for damping vibrations in the resilient convoluted members of a spring or a bellows structure without affecting the sensitivity and responsiveness of said resilient convoluted members.

An additional object of the present invention is to provide a device for damping vibrations in a bellows structure, which said device is economical in manufacture, simple in operation, and durable and reliable in use.

For a fuller description of the nature and objects of the invention reference should be had to the following detailed description taken in connection with the accompanying drawing wherein:

FIG. 1 is a side elevational view of a typical fluid seal embodying the present invention;

FIG. 2 is an end elevation of the fluid seal of FIG. 1;

FIG. 3 is a view taken along line 3—3 of FIG. 2 with a support housing added for purposes of illustrating a seating means for a fluid seal.

FIG. 4 is a detailed perspective view of one form of the improved vibration damping means of the present invention;

FIG. 5 is a view similar to FIG. 3 illustrating a modified arrangement of the vibration damping means in relationship to the bellows; and FIG. 6 is a view similar to FIG. 4 illustrating an alternative form of the vibration damping means.

FIG. 7 is a fragmentary vertical cross sectional view taken on line 7—7 of FIG. 8.

FIG. 8 is a fragmentary cross sectional view taken on line 8—8 of FIG. 7.

FIG. 9 is a fragmentary perspective view partly in cross section of a modified form of damping device.

FIG. 10 is a view similar to FIG. 3 illustrating a damping means in relationship to a coil spring.

In general, the structure of the present invention comprises resilient convoluted members enclosed within a housing. The housing may be suitably retained within a portion of a pump frame or the like. The resilient convoluted members as illustrated, surround a rotatable shaft. In turn, the shaft supports a rotary sealing face thereon. A bellows, for example, is connected at one of its ends to a flange and urges the opposite end provided with a sealing ring against the sealing face by the combined force of the resilient convoluted members, plus the pressure of fluid surrounding the bellows and exerting a force against the faces of the resilient convoluted members. In this fashion, fluid is prevented from passing beyond the seal interfaces of the sealing face and sealing ring and, therefore, is prevented from passage along the shaft beyond the sealing members. The invention contemplates, in conjunction with resilient convoluted members, means for damping vibrations of said resilient convoluted members. Said means is configured as a ring or band arranged to surround the resilient convoluted members withing a housing. This band is provided with means for lightly communicating with at least a portion of the resilient convoluted members constituting the bellows (or spring). Such communication may be with an end portion of the bellows. A further section of said band contacts the interior of the housing. Vibrations which would otherwise be set up in the resilient convoluted members are effectively damped by the light frictional contact of the band with said convolutions; the band construction serving to check the vibrations which might otherwise occur.

Turning now to a detailed description of the present invention, reference is first made to FIGS. 1 and 2 wherein there is illustrated a fluid seal, generally indicated at 10, incorporating the present invention. It is to be understood that a fluid seal has been selected only for illustrating an application of the present invention since such seals customarily employ bellows or coil springs. While the invention is shown and described in connection with a fluid seal the invention is also equally applicable to other structures employing bellows or coil springs. The fluid seal 10 is seen to be mounted for rotation on a rotatable shaft 12 and, as illustrated, would prevent the passage of fluid along shaft 12 past the fluid seal.

With attention now to FIGS. 1, 2, and 3 the fluid seal 10 includes an annular cup or housing 14 for enclosing parts of the fluid seal. The housing may be pressed into a suitable cavity 15 in a pump casing 16 as shown in FIG. 3. One end of housing 14 is turned inwardly to form a flange 18. The other end is turned inwardly to form a rim 19. In turn, this flange 18 provides a means for the attachment of a circular member 20 forming an integral part of a bellows structure. An elongated, tubular bellows structure 22 is situated within housing 14. Said bellows 22 extending axially of and surrounds part of shaft 12. Bellows 22 is constituted as a plurality of annular metallic plates having aligned central apertures therethrough for accommodating shaft 12. The inner margins of adjoining plates being welded together and the outer margins of adjoining plates being welded together to provide a plurality of resilient convoluted members. The last convolution on one end of bellows 22 is fastened to circular member 20. Circular member 20 is fastened to flange 18. It being understood that flange 18 and circular member 20 may be of integral construction. The last convolution on the opposite end of bellows 22 is fastened to an annular retainer 24. As seen in FIG. 3 shaft 12 is provided with a hub member 26 connected with the shaft 12 and bearing on a shoulder 27 turned into said shaft. A sealing face 25 is provided in hub-member 26. A sealing ring 28 is provided in annular retainer 24. Sealing ring 28 mates with sealing face 25 to form a fluid tight seal. Sealing ring 28 may be a separate ring construction or it may be an integral part of said annular retainer 24. From the foregoing description considered in connection with the drawing it will be apparent that as shaft 12 is rotated sealing face 25 will rotate, and mating sealing ring 28 will be held stationary. Yet an effective fluid-tight seal is provided in the interface of sealing face 25 and sealing ring 28 which prevents passage of fluid therebetween and along shaft 12. For example, if a fluid reservoir should be present along shaft 12 and to the left of sealing ring 28, as viewed in FIG. 3 the fluid would be free to flow inwardly of shaft 12 surrounding the interior of bellows 22, that is to say, the zone between the bellows and shaft 12. Yet, the fluid would be contained therein since it could not flow past the contact surface of sealing face 25 and sealing ring 28. Moreover, the pressure of the fluid surrounding the resilient convoluted members of bellows 22 would serve as an ancillary biasing force, cooperatively with the resilient force of the convoluted members 22, to urge sealing ring 28 against its mating sealing face 25. Now, if it be assumed that the fluid reservoir is on the right-hand side of sealing ring 28, as veiwed in FIG. 3, then fluid may readily enter the zone between bellows 22 and housing 14. Yet, the fluid will be restricted from passage beyond the sealing face 25 and sealing ring 28. Again here, the fluid surrounding the resilient convoluted members of bellows 22 assists the normal biasing force of the bellows acting on sealing ring 28 to urge it into engagement with sealing face 25.

With continuing attention to FIGS. 3 and 4, there is shown a vibration damping means comprising a circular band 30 positioned within housing 14. One portion of band 30 is in circumferential contact with the interior wall of the housing 14 and a further portion of band 30 bears lightly around the circumferential outer edges of the resilient convoluted members constituting the bellows 22. As best seen in FIG. 4 band 30 is constructed as a rather wide body member provided with a plurality of equidistantly spaced, prongs, dogs or cleats 32 projecting radially outward. These prongs 32 are situated in the medial plane of the band 30 and each prong 32 terminates in a flat step 32A which is adapted to bear against the inside wall of housing 14. Band 30 may be constructed of spring steel or like material in which event it may be advantageously mounted within housing 14 with the prongs 32 biased against the inner wall of the housing to thereby locate and hold the band in position. A circumferential groove 31 may be provided in housing 14 to assist in holding prongs 32 in position. The band 30 may be of a resilient material with the body member located and held in groove 31. In either event it will be understood that the spacing between the outside diameter of band 30, that is, the diameter of a theoretical line around the outside of prongs 32, and the internal diameter of the band as defined by the interior wall 33 of band 30 on the side remote from prongs 32, will just be sufficient to permit the interior wall 33 of the band 30 to touch the convolutions of the bellows 22 when the prongs are bearing on the wall of housing 14. Thus, the convolutions of the bellows 22 are free for axial movement intermediate the end of the bellows which is attached to circular member 20 and the opposing bellows end which is connected to sealing ring 28. However, the convolutions of bellows 22 are effectively prevented from responding to external vibrations or harmonic frequencies which would otherwise cause the bellows convolutions to "walk" or gang up at one end or the other of the bellows so as to place an inordinate strain on the welded plates which would cause the plates to separate with ensuing failure of the bellows.

In FIG. 6 there is shown an alternative arrangement for positioning the vibration damping means. For convenience of illustration, the fluid seal of FIG. 5 is seen to employ a modified form of vibration damping band 40, this annulus being shown in detail in FIG. 6. It will be appreciated that except for the modified form of band, the fluid seal of FIG. 5 is identical with that of FIG. 3 and like reference numerals are employed in connection with both figures to indicate like parts. The form of annulus shown in FIG. 6 embodies a rather wide body member having a plurality of spaced prongs 42, each prong being configured in essentially the same shape as the prongs of band 30. However, in the embodiment of FIG. 6, the prongs 42 are positioned to extend inwardly from the common circle defined by band 40. Therefore, as shown in FIG. 5 the main body of the band is caused to bear on the inner wall of housing 14 and the prongs 42 are positioned to bear on the outer diameter of annular retainer 24. It will be understood that in the construction of FIG. 5, as is true in that of FIG. 3, the contact between the unsupported end of each prong, i.e., the end of the prong remote from the main body of band 40, and the annular retainer 24 is under very light pressure so as to permit free, substantially uninhibited axial movement of the annular retainer 24. Yet, it is rather remarkable that the band 40 is effective in the same manner as was band 32, to damp vibrations which would otherwise be deleterious to the convolutions of the bellows 22. It will be readily apparent that band 40 may be constructed as a spring member in order that it may bias itself under its inherent spring force against the inner wall of housing 14 to be held in position. A circumferential groove 41 may be provided in housing 14 to assist in holding annulus 40 in position. On the other hand, it may be constructed of other non-resilient materials in which event it could be suitably attached to the inner wall of housing 14 by welding, cementing or the like.

In FIGS. 7, 8 and 9 there is shown a modified form of damping means. For convenience of illustration, the fluid seal of FIGS. 3 and 5 is illustrated. It will be appreciated that except for the modified form of band, the fluid seal of FIGS. 3 and 5 is identical with that of FIGS. 7 and 8 and like reference numerals are employed in connection with FIGS. 3, 5, 7 and 8 to indicate like parts.

The form shown in FIGS. 7, 8 and 9 employs three separate prongs or cleats 32B. Housing 14 is provided with three grooves 53, 54, 55 equally spaced. FIG. 9 illustrates the single cleat or prong 32B which may be taken as the portion of one cleat 32 of band 30 with wall 33A flat instead of circular as shown in FIG. 4 at 33 to form a single body member having a single prong 32B.

The prongs 32B set in grooves 53, 54, 55 point circumferential contacts on the convolutions of bellows 22. Thus, the prongs 32B tend to hold the convolutions in medial position while damping the vibrations therein by dissipating the vibration energy to housing 14.

In FIG. 10 there is shown a modified form of seal construction incorporating a coil spring instead of a bellows to provide the resilient means necessary to urge the sealing ring into engagement with the sealing face to provide a fluid tight seal. Casing 16A is the same as casing 16. Housing 14A is pressed into a suitable cavity 15A. Housing 14A is provided with a flange 18A having a circular recess 60 and with rim 19A. A prong 61 and a groove 31A are also formed in housing 14A.

Shaft 12A is provided with a shoulder 27A and a seat 62. A retainer 24A is slidably mounted upon seat 62 and is provided with a counterbored area 63. A hub-like member 26A is mounted upon seat 62 abutting shoulder 27A and is provided with a sealing face 25A. A sealing ring 28A is secured in counterbored area 63 and is adapted to engage sealing face 25A. Retainer 24A is provided with a circular projection 64 having a wall 65. Prong 61 projects into an orifice located in circular projection 64, for that purpose, to prevent retainer 24A from rotating. Fluid packing 66 is located in circular recess 60 to engage retainer 24A and thereby provide a fluid tight seal. A coil spring 67 is positioned around retainer 24A with one end abutting flange 18A and with the opposite end abutting wall 65 to thereby yieldingly urge sealing ring 28A into engagement with sealing face 25A.

The circular band 30 illustrated in FIG. 4 and provided with dogs 32 is positioned in groove 31A with interior wall 33 engaging the convolutions of coil spring 67 in the same manner and for the same purpose as described for circular band 30 in relation to the bellows illustrated in FIG. 3.

With the present invention vibrations introduced from an external source to the bellows is effectively damped thereby permitting the bellows to function effectively even in environments which would otherwise yield rather severe vibrations that could seriously limit the life of the bellows. As such external vibrations are transmitted to the zone of the bellows these vibrations are absorbed by the band, that is to say, the energy of the vibrations is dissipated by the contact of the band with the bellows and the housing 14. Indeed, it is doubtful that resonant vibrations would even be introduced to the bellows in practice with the vibration damping means of the present invention. Certainly this is highly unlikely where the band is in contact with all of the convolutions of the bellows. However, it is quite apparent that any such vibrations which would be started anywhere in the bellows would rapidly be dissipated in practice with the present invention. Moreover, notwithstanding the high efficiency of the vibration damping means of the instant invention the bellows are free at all times for axial motion to thereby yield a highly efficient fluid seal. In consequence of the foregoing, it will be seen that the present invention provides a vibration damping means for a bellows structure, which said structure is capable of reliable operation over a long life.

It is understood that the foregoing description is illustrative of preferred embodiments of the present invention only and the scope of the present invention is not to be limited thereto, but is to be determined by the appended claims.

What I claim is:

1. A vibration damping means for a resilient convoluted member used with a fluid seal, said fluid seal comprising a shaft, a hub member, provided with a sealing face, fastened to said shaft, an annular retainer provided with a sealing ring, a housing provided with a flange and a plurality of circumferentially spaced grooves, said resilient convoluted member interposed between said flange and said annular retainer to urge said sealing ring into engagement with said sealing face to form a fluid tight seal, and a vibration damping means comprising a plurality of body members one for each of said plurality of grooves, each body member having a prong engaging said resilient convoluted member to damp vibration occurring in said resilient convoluted member by transferring vibrations from the bellows to the housing while permitting free axial movement of said resilient convoluted member.

2. A vibration damping means for a bellows used with a fluid seal, said fluid seal consisting of a bellows having a plurality of convolutions, a circular member, means fastening one end of said bellows to said circualr member, an annular retainer, means fastening the opposite end of said bellows to said annular retainer, a shaft provided with a hub member, said hub member having a sealing face, a sealing ring fastened to said annular retainer and engaging said sealing face, an annular cup havig a flange, means fastening said circular member to said flange, and a vibration damping means comprising a circular band provided with a plurality of outwardly projecting prongs and an inner wall, said prongs engaging said annular cup with said inner wall touching the convolutions of said bellows, thereby to reduce the amplitude of vibrations created in the bellows through rotation of the shaft without affecting the sensitivity and responsiveness of the bellows.

3. A vibration damping means for a bellows used with a fluid seal, said fluid seal consisting of a bellows having a plurality of convolutions, a circular member, means fastening one end of said bellows to said circular member, an annular retainer, means fastening the opposite end of said bellows to said annular retainer, a hub member having a sealing face, a sealing ring fastened to said annular retainer and engaging said sealing face, an anular cup having a flange, means fastening said circular member to said flange, and a vibration damping means interposed between said annular cup and said bellows to damp vibrations occurring in said bellows while permitting free axial movement of said bellows, said vibration damping means comprising a circular band having an inner wall and a plurality of inwardly projecting prongs engaging said bellows with said circular band engaging said annular cup.

4. A vibration damping means for a bellows used with a fluid seal, said fluid seal consisting of a bellows having a plurality of convolutions, a circular member, means fastening one end of said bellows to said circular member, an annular retainer, means fastening the opposite end of said bellows to said annular retainer, a hub member having a sealing face, a sealing ring fastened to said annular retainer and engaging said sealing face, an annular cup having a flange, means fastening said circular member to said flange, and a vibration damping means interposed between said annular cup and said bellows to damp vibrations occurring in said bellows while permitting free axial movement of said bellows, said vibration damping means comprising a circular band having an inner wall and a plurality of inwardly projecting prongs engaging said bellows with said circular band engaging said annular cup, said annular cup being provided with a circumferential groove, said circular band being located in said circumferential groove to be retained therein.

References Cited

UNITED STATES PATENTS

| | | | |
|---|---|---|---|
| 1,822,052 | 9/1931 | Maccabee. | |
| 2,115,346 | 4/1938 | Summers | 277—88 |
| 2,434,794 | 1/1948 | Giesler. | |
| 2,094,160 | 9/1937 | Oldberg | 277—88 |
| 2,174,623 | 10/1939 | Dasher | 308—36.2 |
| 2,601,996 | 7/1952 | Sefren | 277—88 X |
| 3,026,114 | 3/1962 | Andresen et al. | 277—88 X |
| 3,124,363 | 3/1964 | Cieslik | 277—42 |

LAVERNE D. GEIGER, Primary Examiner

J. S. MEDNICK, Assistant Examiner

U.S. Cl. X.R.

277—87